(No Model.)
F. I. PEARCE.
ENDLESS OR PAN CONVEYER.
No. 312,891. Patented Feb. 24, 1885.
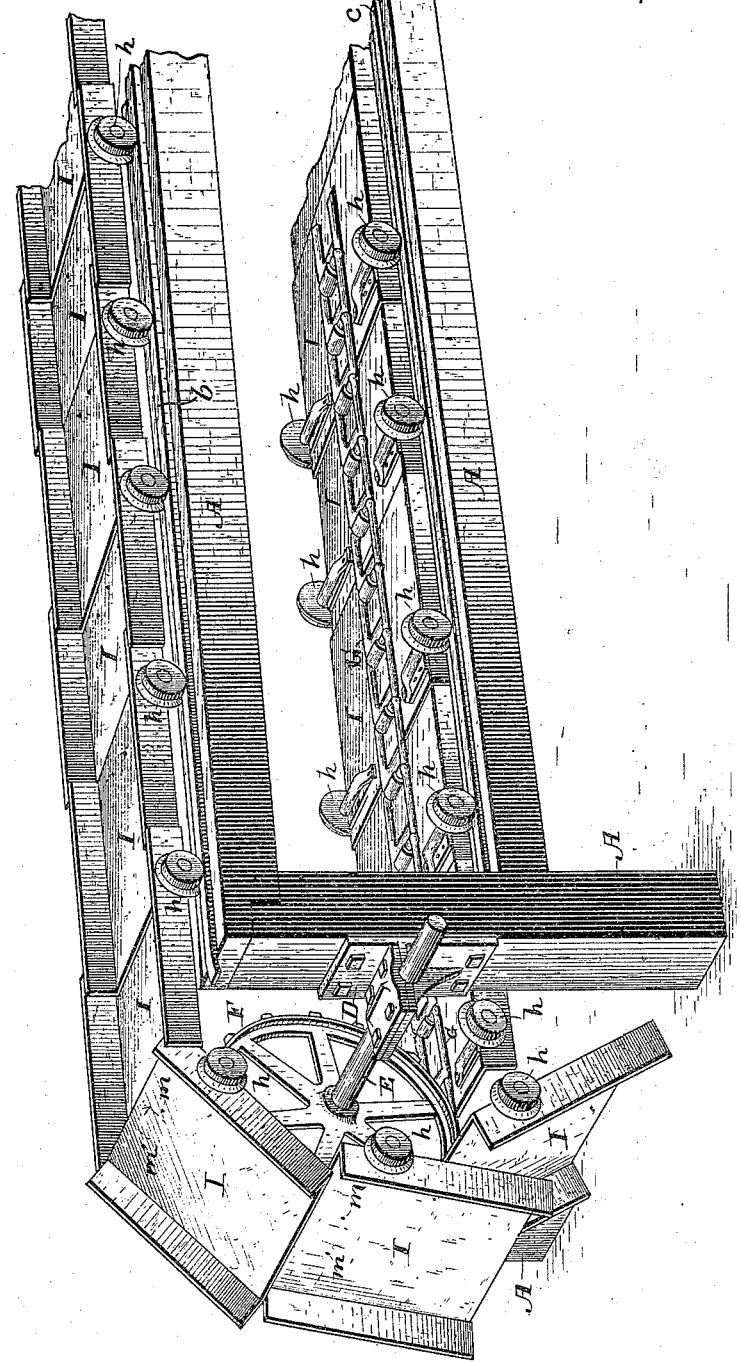
ATTEST
J. Henry Kaiser
Jacob Felbel
INVENTOR.
Frank I. Pearce
By J. N. McIntire
Atty.

UNITED STATES PATENT OFFICE.

FRANK I. PEARCE, OF CHICAGO, ILLINOIS, ASSIGNOR TO THE LINK BELT MACHINERY COMPANY, OF SAME PLACE.

ENDLESS OR PAN CONVEYER.

SPECIFICATION forming part of Letters Patent No. 312,891, dated February 24, 1885.

Application filed December 18, 1884. (No model.)

*To all whom it may concern:*

Be it known that I, FRANK I. PEARCE, of Chicago, in the county of Cook and State of Illinois, have invented certain new and useful Improvements in Endless or Pan Conveyers; and I do hereby declare that the following is a full, clear, and exact description thereof, reference being had to the accompanying drawing, making part of this application.

My invention relates to certain new and useful improvements in that class or type of conveyers which are composed, essentially, of a series of pans in some manner mounted upon or secured to an endless drive-chain or carrier, and adapted to convey materials of different sorts from one destination to another, automatically discharging the material in the vicinity of the locality at which the series of trough-like pans turn over one of the wheels of the endless chain, thus dumping their contents.

My invention consists in the several novel features of construction, which will be hereinafter more fully explained, and which will be found particularly pointed out and defined in the claims of this specification.

To enable those skilled in the art to which my invention relates to make and use the same, I will now proceed to describe more particularly the construction and operation of my improved pan conveyer, referring by letters of reference to the accompanying drawing, which forms part of this specification, and in which I have illustrated my improved contrivance by a partially perspective view of the same.

In the drawing, A represents any suitable supporting frame or frame-work for supporting the forward and return tracks, (marked, respectively, $b$ and $c$,) and to which may be properly secured at either end the cast-iron stands and boxes D, in which are mounted and run the shafts E, that carry chain or sprocket wheels F, over the peripheries of which is banded endless drive-chain or other carrier-belt, G. To this chain carrier or belt G are properly secured at the under portions of their bottoms the carrier-pans I, each one of which, as clearly seen, is composed of a plane bottom and two nearly or quite vertical sides, thus presenting a trough-like appearance, and the relative arrangement of these pans I thus secured to the carrier G is such that the forward or leading end of each pan-bottom overlaps and rests upon the rearmost portion of the bottom of the preceding pan, so that when the pans are traveling in the same horizontal plane the series of pans constitutes practically a continuous trough-like receptacle, as clearly illustrated by the series of pans represented in the drawing as traveling immediately over the uppermost track, $b$, of the elevator-frame, and the point or points at which the bottom of each pan is secured or fastened to the carrier device G is so much nearer to the rearmost end of the pan than to its forward end (as seen at $m\ m$) that when the pans shall come to successively tip in passing around the chain-wheel F to dump the contents of the conveyer the forward end of each pan will project well over and beyond the rearmost portion of the bottom of the pan in front of it, thus insuring the effect of discharging the contents of each pan entirely clear of the pan in front of the one being emptied. This is an important feature in my improved contrivance.

$h$ represents a series of truck-wheels, which are secured, as shown, to the pans I, and which are adapted to travel, as shown, both upon the forward or upper track, $b$, and upon the return-track $c$, for the purposes of properly supporting the pans I and the contents thereof while traveling over the track $b$, and supporting the inverted and emptied pans during their return movement to the locality at which they are to be refilled. There is but one pair or set of these truck-wheels $h$ to each one of the pans I; but the arrangement of said pair of wheels on each pan is such (they being located near the rear end of the pan) and the relative arrangement and overlapping of the forward and rear ends of each pair of adjacent pans is such, the forward overlapping end of one pan extending slightly beyond the locality of the axis of the truck-wheels $h$ of the pan in front of it, that when a series of the pans provided each with one set of truck-wheels, as shown, is in line on a track, such as $b$, the practical effect is that the load of each pan is in reality supported by or divided between the pairs, or four, of the truck-wheels $h$. This is another important feature of my improved contrivance, and one which I consider of great value.

Another novel and important feature in my improved construction is the arrangement, as shown, of the truck-wheels at each side of, entirely outside of, the carrier-pans I.

In the operation of my improved contrivance the material to be conveyed may, as usual, be supplied to the upper run of pans I at any desired point, and as they travel in the directions indicated by the arrows their contents will be dumped or discharged in the vicinity of the locality at which the pans descend over and around one of the chain-wheels or carrier-pulleys F, and the weight of the empty pans will be supported on the return-track c, on which the truck-wheels h travel, as shown, with their pans I in an inverted position.

Of course the sizes and proportions of the pans shown and described and many of the details of construction may be materially varied without changing the principle of construction or mode of operation of the machine, and hence without departing from the spirit of my invention.

Having now so fully explained the construction and operation of my improved endless pan conveyer that those skilled in the art can make and use my invention, what I claim as new, and desire to secure by Letters Patent, is—

1. In combination with the chain or other carrier, a series of pans, each one of which is attached to said chain or carrier at such a point in rear of the middle of the pan lengthwise that while the series of pans overlap when in line to form a continuous pan or trough, as shown, the leading end of each pan will substantially overhang and project beyond the rear end of the pan immediately in front of it whenever the series of pans is passing over the chain wheel or pulley at that end of the conveyer at which the material is to be dumped or discharged, all substantially as hereinbefore set forth.

2. The combination, with a series of overlapping pans, of a series of supporting wheels or trucks, one pair of wheels only to each pan, but the arrangement of each pair of wheels relatively to the overlapping ends of every two pans being such, as described, that each pair of wheels operate practically as a direct support to the rear end of one pan and to the forward end of the pan next in rear of it, thus effecting in substance the support of the load in each pan of two pairs or four wheels, substantially as hereinbefore set forth.

3. In a conveyer composed of a series of pans mounted on an endless carrier chain or belt, the combination, with said series of pans, of a series of supporting or truck wheels located on each side of and entirely outside of the pans, and a return-track for the inverted pan truck-wheels to travel on, all substantially in the manner hereinbefore set forth.

In witness whereof I have hereunto set my hand this 25th day of November, 1884.

FRANK I. PEARCE.

In presence of—
  GEO. E. JOHNSON, Jr.,
  WILL. P. SISSON.